United States Patent [19]
Evans et al.

[11] Patent Number: 5,579,428
[45] Date of Patent: Nov. 26, 1996

[54] SOLITONS IN DISPERSION FLATTENED WAVEGUIDE

[75] Inventors: Alan F. Evans, Beaver Dams; Donald B. Keck, Big Flats, both of N.Y.

[73] Assignee: Corning Incorporated, Corning, N.Y.

[21] Appl. No.: 482,716

[22] Filed: Jun. 7, 1995

[51] Int. Cl.⁶ .................................................. G02B 6/18
[52] U.S. Cl. ............................................. 385/124; 385/123
[58] Field of Search ................................. 385/15, 24, 27, 385/122–127

[56] References Cited

U.S. PATENT DOCUMENTS

| | | | |
|---|---|---|---|
| 4,715,679 | 12/1987 | Bhagavatula | 385/127 |
| 4,877,304 | 10/1989 | Bhagavatula | 385/124 |
| 4,889,404 | 12/1989 | Bhagavatula et al. | 385/123 X |
| 4,932,739 | 6/1990 | Islam | 385/15 X |
| 4,969,710 | 11/1990 | Tick et al. | 385/123 |
| 5,042,906 | 8/1991 | Chesler et al. | 385/123 |
| 5,361,319 | 11/1994 | Antos et al. | 385/123 |
| 5,365,362 | 11/1994 | Gnauck et al. | 385/122 X |

OTHER PUBLICATIONS

L. F. Mollenauer, E. Lichtman, G. T. Harvey, M. J. Neubelt and B. M. Nyman, "Demonstration of Error–Free Soliton Transmission Over More Than 15000km at 5 Gbit/s, Single Channel, and Over more than 11,000km at 10 Gbit/s in Two Channels WDM", Electronics Letters, Apr. 9, 1992, vol. 28, No. 8, pp. 792–794.

Michel Monerie, "Propagation in Doubly Clad Single–Mode Fibers", IEEE Journal of Quantum Electronics, Apr. 1982, vol. QE–18, No. 4, pp. 535–542.

Yangsheng Gao, Xisheng Cong, and Shuisheng Jian, "Attenuation–Optimized Dispersion–Flattened Quadruple––Clad Fibers with Moderate F–doping in the First Inner Cladding", IEEE Photonics Technology Letters, Jun. 1992, vol. 4, No. 6, pp. 638–641.

P. A. Andrekson, N. A. Olsson, P. C. Becker, J. R. Simpson, T. Tanbun–Ek, R. A. Logan, and K. W. Wecht, "Observation of Multiple Wavelength Soliton Collisions in Optical Systems with Fiber Amplifiers", Appl. Phys. Lett. Oct. 22, 1990, vol. 57, No. 17, 22, pp. 1715–1717.

"Low–Loss Quadruple–Clad Single–Mode Lightguide with Dispersion Below 2 ps/km nm Over the 1–28μm–1–65μm–Wavelength Range", Oct. 8, 1982, pp. 275–276, Electronics Letters, L. G. Cohen et al.

B. M. Nyman, S. G. Evangelides, G. T. Harvey, L. F. Mollenauer, P. V. Mamyshev, M. L. Saylors, S. K. Korotky, U. Koren, V. Mizrahi, T. A. Strasser, J. J. Veselka, J. D. Evankow, A. Lucero, J. Nagel, J. Sulhoff, J. Zyskind, P. C. Corbett, M. A. Mills, and G. A. Ferguson, "Soliton WDM Transmission of 8×2.5 Gb/s, Error Free Over 10 Mm", pp. PD21–2–PD21–5 [No Journal Name] [No Date].

*Primary Examiner*—John D. Lee
*Attorney, Agent, or Firm*—William Chervenak

[57] ABSTRACT

A combination of dispersion flattened single mode optical waveguide fiber and soliton signal pulses yields an optimum telecommunication system capacity. The dispersion flattened fiber serves to relax tolerances on soliton center wavelength and intensity. In addition, the inventive combination facilitates the design and use of long haul systems using optical amplifiers.

10 Claims, 3 Drawing Sheets

5,579,428

SOLITONS IN DISPERSION FLATTENED WAVEGUIDE

BACKGROUND

The invention is directed to a dispersion flattened single mode optical waveguide fiber designed for soliton transmission. Further, the invention relates to a dispersion flattened single mode optical waveguide fiber designed to propagate wavelength division multiplexed soliton signals.

It is well known in the art that, because of the non-linearity of the refractive index of $SiO_2$ based waveguides, soliton propagation in such waveguides is possible. A pulse having a prescribed intensity and shape, propagating in a waveguide fiber, will undergo a non-linear self phase modulation (SPM) which produces a pulse spreading, longer wavelengths shifted forward relative to shorter wavelengths. If the waveguide fiber has a total dispersion, D (in units of ps/nm-km of proper magnitude and positive sign (shorter wavelengths travel at higher speed relative to longer wavelengths)), this total dispersion will serve to cancel with the SPM pulse spreading. An alternative statement of the soliton effect is, the non-linear SPM of pulses, which is the dependence of group velocity change on pulse intensity and shape, effectively cancels the frequency dependence of group velocity change.

The transmission of solitons in optical waveguide fiber has been reported by several workers, e.g., Mollenhaur et al., "Demonstration of error-free soliton transmission over more than 15000 km at 5 Gbits/s, single channel, and over more than 11000 Gbits/s in two channel WDM," Electron. Letters 28(8), 792–794(1992). The two channels were separated by 0.4 nm. It is likely that a large dispersion slope of the waveguide forced this small channel spacing and limited the wavelength division multiplexing to only two channels.

With a dispersion flattened single mode waveguide the number of wavelengths multiplexed and the channel spacing could be increased by about a factor of five, providing much larger capacity, less cross channel interference, and wider latitude on tolerances of the multiplexed signals.

Thus, the combination of dispersion flattened waveguide fiber with soliton information transmission provides a powerful tool for increasing waveguide fiber capacity and increasing spacing between regenerators.

Further, a waveguide fiber having a flat slope, greatly simplifies the process of maintaining the intensity required for soliton propagation over several channels. The signal intensity or power required for soliton creation is directly proportional to group velocity dispersion. A dispersion flattened waveguide provides uniform group velocity dispersion over an extended wavelength range. Hence, threshold power for soliton creation is reduced and power from channel to channel is substantially equal. In addition, the tolerance on center frequency of the soliton signal pulses is broadened.

Additional benefits result from the combination of dispersion flattened waveguides and soliton transmission in systems which include optical amplifiers. Very long unregenerated systems, for example the system described in the Mollenhaur et al., Electron Letters, publication cited above, require optical amplifiers. Present technology favors the short length (lumped) erbium doped fiber amplifier (EDFA) technology. However, workers continue to direct their research toward wider wavelength ranges and flatter amplifier gain curves with erbium optical amplifiers as well as optical amplifiers having a variety of alternative compositions.

In a typical waveguide fiber, carrying solitons of different center wavelengths, and thus different speeds, solitons can pass through one another. In a lossless waveguide, for example a waveguide incorporating a distributed optical amplifier, the solitons which pass through one another are essentially unchanged. There is no change in central frequency, shape or intensity of the soliton pulses. However the dispersion flattened waveguide fiber still provides a benefit. As noted above, soliton power depends directly upon dispersion. Also, the amplifier gain curve as a function of wavelength is not flat. In a non-dispersion flattened waveguide fiber design, the solitons of different center wavelength have different threshold power, because dispersion varies with wavelength and threshold power depends upon dispersion. The difference in soliton power may be magnified by the dependence of amplifier gain on wavelength. Thus, starting the solitons of different central wavelength at about the same power level, as can be done in a dispersion flattened waveguide fiber, will tend to minimize soliton power differences due to variation of amplifier gain with wavelength.

The advantage of a dispersion flattened waveguide fiber is greater when short length (lumped), i.e., non-distributed optical amplifiers are used. Mollenauer et al., "Wavelength Division Multiplexing with Solitons in Ultra-Long Distance Transmission Using Lumped Amplifiers", Journal of Lightwave Tech., V.9, #3, March 1991, have shown that the solitons do not interact when passing through one another (collide), in systems using short length (lumped) optical amplifiers, provided the length of waveguide over which the solitons collide is long relative to the optical amplifier spacing.

The benefit derived from using a dispersion flattened waveguide in the soliton pulse system is clear. Because dispersion slope is small for this waveguide fiber, the difference in speed between solitons of different center wavelength is smaller than that for, say, a standard dispersion shifted waveguide fiber. The result is that the waveguide length over which a soliton collision occurs is increased, and thus a collision occurs over several amplifier spacing lengths, thereby minimizing the effect of the lumped amplifiers on soliton center wavelength or relative position along the waveguide.

In summary, the use of the combination of soliton signal pulses together with dispersion flattened waveguide fiber provides:

an increased range of wavelengths for wavelength division multiplexing;

a minimization of soliton pulse power variation, in systems using distributed amplifiers due to variation of amplifier gain with wavelength;

a minimization of temporal or center wavelength shifts of solitons colliding in systems using lumped optical amplifiers;

a larger tolerance on soliton center wavelength;

more multiplexed signals having a channel spacing sufficient to reduce channel cross talk and relax wavelength division multiplexing constraints;

a reduced required power level and power level control on wavelength division multiplexed soliton signal pulses; and, a reduced dispersive effect due to different polarization modes by reducing intensity level dependent waveguide bi-refringence.

The inventive combination of soliton signal pulses and dispersion flattened waveguide fiber may be expected to play a major role in the many planned installations of high performance, long distance waveguide fiber telecommunications systems. This will be especially true for those high performance systems incorporating lumped optical amplifiers.

Definitions

A refractive index profile is made up of the refractive indexes defined at each point along a radius measured from the waveguide centerline to a point on the periphery of the core region. A refractive index profile may have a plurality of distinct sub-sections, a profile of a sub-section being defined along a segment of the core region radius.

The refractive index profile features, which may serve to distinguish a profile sub-section from adjacent profile sub-sections include, a step change in refractive index magnitude, a maximum or minimum of refractive index, a change in slope of the index profile or a change in shape of the index profile.

For the silica based waveguides discussed in this document, a positive total dispersion for wavelengths above about 1300 nm results in shorter wavelengths travelling faster than longer wavelengths. Below 1300 nm a sign convention opposite to the above is used. In this document, only wavelengths at or above 1300 nm are considered.

Self phase modulation, due to the non-linear refractive index of the silica based glasses, shifts the longer wavelengths forward relative to the shorter wavelengths in a pulse. The positive total dispersion of the waveguide serves to offset the non-linear self phase modulation effect, thereby creating a soliton pulse, i.e., a pulse whose shape does not change as it traverses the waveguide.

SUMMARY OF THE INVENTION

A first aspect of the invention is a dispersion flattened single mode optical waveguide fiber having a core glass region comprising at least two sub-sections. The surrounding cladding glass has a characteristic refractive index $n_c$. For the waveguide structure to guide light, at least a portion of the core refractive index profile must have a refractive index greater than $n_c$. The waveguide fiber is characterized by a pre-selected positive total dispersion and a pre-selected total dispersion slope defined over a particular wavelength range. The total dispersion and total dispersion slope are chosen to transmit, essentially unchanged, soliton signal pulses having center wavelengths within the particular wavelength range.

A wavelength range important in long distance, high speed telecommunications is the operating wavelength range from about 1520 nm to 1575 nm. However, waveguide fibers having substantially flat dispersion curves over larger wavelength ranges, e.g., from about 1300 nm to 1600 nm, are possible. Hence the inventive combination of solitons propagating in dispersion flattened waveguide fibers, encompasses essentially all practical wavelength ranges for telecommunications above about 1300 nm. Dispersion flattened waveguide fiber designs below 1300 nm are also contemplated.

Above 1300 nm, the small positive total dispersion required to cancel the self phase modulation of the solitons is in the range of about 0.1 to 5.0 ps/nm-km. (See the definitions section for the total dispersion sign convention.) The optical waveguide is designed to yield a total dispersion slope less than about 0.10 ps/nm²-km so that the soliton signal pulses of different center wavelengths all are subject to essentially the same amount of total dispersion. In this way, soliton signal pulses having a range of center wavelengths and about the same intensity will be preserved as solitons over the waveguide fiber length.

Another aspect of the invention is a dispersion flattened single mode optical waveguide fiber used to transmit soliton signal pulses in a telecommunication system incorporating one or more discrete optical amplifiers or incorporating a distributed amplifier waveguide fiber. As before, the dispersion flattened waveguide fiber core comprises at least two sub-sections.

In the case of a distributed optical amplifier, i.e., one in which the amplification occurs substantially uniformly along essentially the entire length of the waveguide fiber length, the attenuation is essentially everywhere zero, so that soliton collisions do not cause a shift in soliton center frequency or in soliton relative phase. However, the dispersion flattened waveguide fiber provides benefit of limiting soliton power shifts due to variation in the amplifier gain curve with wavelength as described above. The flatness of the dispersion slope effectively prevents two soliton pulses from passing through one another within the length of a single optical amplifier. That is, the speeds of soliton signal pulses of different central wavelengths are so nearly equal that a long distance, relative to the optical amplifier length, is traversed as one soliton passes through and another. This long length interaction serves to minimize temporal and spectral shifts induced in the soliton signal pulse by the optical amplifier.

In a preferred embodiment, the effective operating wavelength of the at least one optical amplifier, the wavelength range over which the waveguide has the required total dispersion and total dispersion slope, and the range of center wavelengths of the soliton signal pulses have a substantial overlap. Ideally, the three wavelength ranges coincide.

DETAILED DESCRIPTION

The inventive combination of a dispersion flattened optical waveguide fiber and soliton signal pulses greatly facilitates the construction of very high data rate telecommunications systems having very long regenerator spacing. The invention is essential to the realization of high channel count wavelength division multiplexed systems using soliton signal pulses and optical amplifiers.

The invention of the optical amplifier together with the achievement of stable soliton pulses in an optical waveguide presents an unusual opportunity to advance telecommunication technology. The optical amplifier and the soliton together make possible a telecommunication system which has essentially no attenuation and no dispersion. Noise due to imperfect optical amplifiers, imperfect sources and waveguides limits the achievable system length. However, the distance between regenerators can be made large and the waveguide capacity is greatly increased both for single channel and wavelength division multiplexed systems.

A single mode optical waveguide fiber having a relatively flat total dispersion vs. wavelength curve, facilitates the creation of solitons, facilitates the maintenance of solitons, facilitates wavelength division multiplexing of soliton signal pulses, reduces the impact of amplifier gain vs. wavelength variation in distributed amplifier systems, and, reduces the negative impact of soliton collisions which occur in systems incorporating lumped optical amplifiers.

Figure 1:
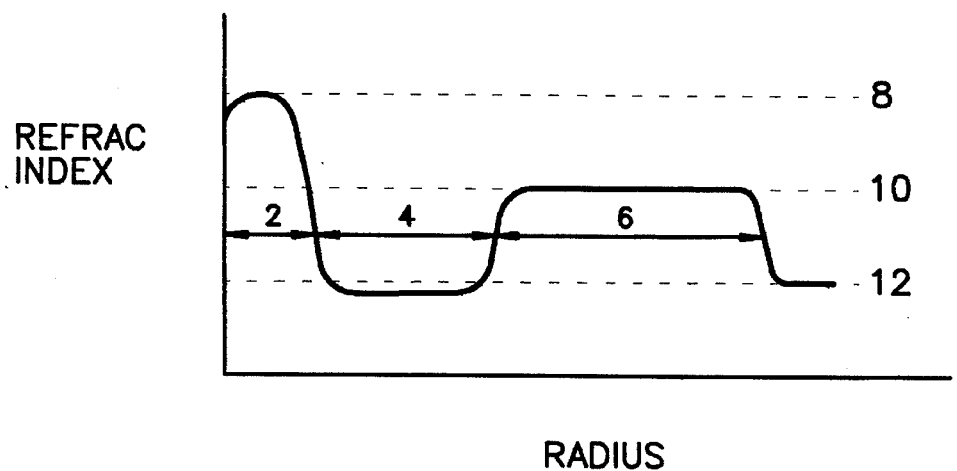
FIG. 1 illustrates a refractive index profile of a waveguide having a core region having at least two sub-sections.

The single mode optical waveguide refractive index profile, illustrated in FIG. 1, show an index profile having at least two sub-sections. Such profiles are discussed in detail in U.S. Pat. No. 4,715,679, Bhagavatula and in several other patents and publications well known in the art. The advantage of this index profile genus is that it provides sufficient variables to achieve essentially any desired total dispersion vs. wavelength characteristic.

The '679 patent shows some of the choices of index profile widths, 2, 4, and 6, an with values 8, 10, and 12 which provide a dispersion flattened single mode fiber. Several alternative designs for dispersion flattened fiber are described in the literature related to the art. For example, "Dispersion Flattened Single Mode Fibers for the Subscriber Loop", Steib et al., IWCS Proceedings 1989, describes a waveguide having a substantially flat dispersion over a wavelength range from about 1300 nm to 1550 nm.

A preferred operating wavelength range for the present inventive combination is from about 1520 nm to 1575 nm, although systems operating over much broader wavelength ranges, viz., about 1300 nm to 1600 nm are contemplated. For either of these wavelength ranges, and, indeed for other ranges which fall outside either of these, one of ordinary skill in the art can choose the respective design features numbered in FIG. 1, to produce a waveguide having a pre-selected total dispersion value over a pre-selected wavelength range and a very low dispersion vs. wavelength slope.

In particular, a preferred embodiment of the dispersion flattened single mode waveguide, wherein the total dispersion is in the range of about 0.1 to 5.0 ps/nm-km and the total dispersion slope is no greater than about 0.10 ps/nm$^2$-km and typically less than 0.05 ps/nm$^2$-km, is readily attainable using the basic design of FIG. 1.

Figure 3:
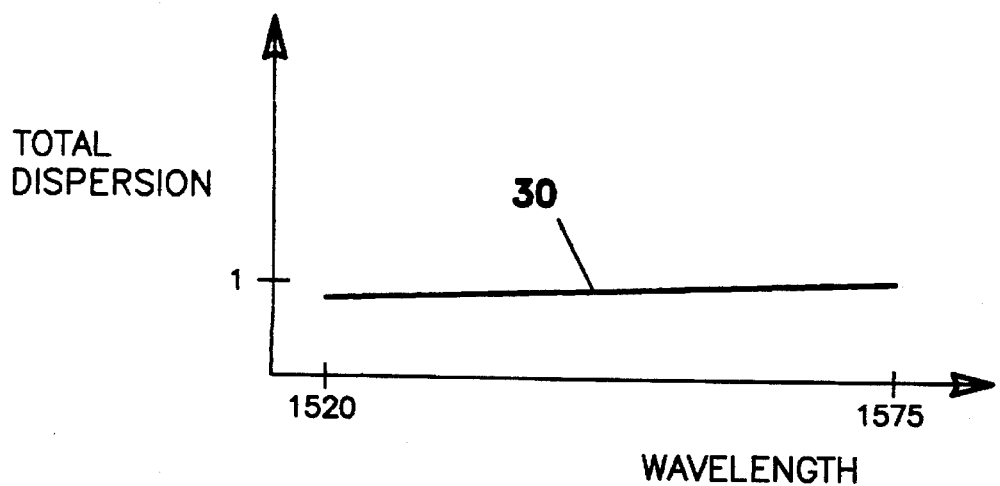
FIG. 3 is a chart showing a representative total dispersion vs. wavelength curve.

A typical total dispersion curve is shown in FIG. 3. If a design is chosen having total dispersion 1 ps/nm-km at 1520 nm, at 1575 nm the total dispersion is less than 4 ps/nm-km, as shown by line 30, where the total dispersion slope is about 0.05 ps/nm$^2$-km.

Figure 2:
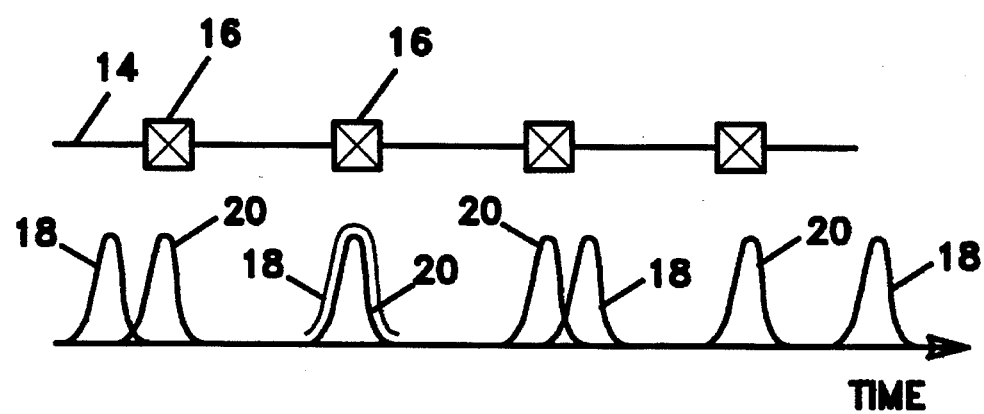
FIG. 2 is a schematic drawing of two solitons colliding over a waveguide length incorporating optical amplifiers.

The long collision length of the dispersion flattened waveguide is illustrated in FIG. 2. The line 14 represents an optical waveguide transmission fine, having a plurality of optical amplifiers 16. Below the transmission line 14, is an illustrative time line showing the collision of soliton signal pulses 18 and 20 which are travelling in transmission line 14. Proceeding from left to right on the time line, pulse 18 is shown first contacting pulse 20. At the next time point pulse 18 has moved into coincidence with pulse 20. The final two time points show pulse 18 passing through pulse 20.

During the collision, the pulses are shown as having traversed more that three optical amplifiers 16. The long collision length is due to the low slope of the total dispersion which limits the difference in speed of soliton signal pulses having different center wavelengths.

Figure 4:
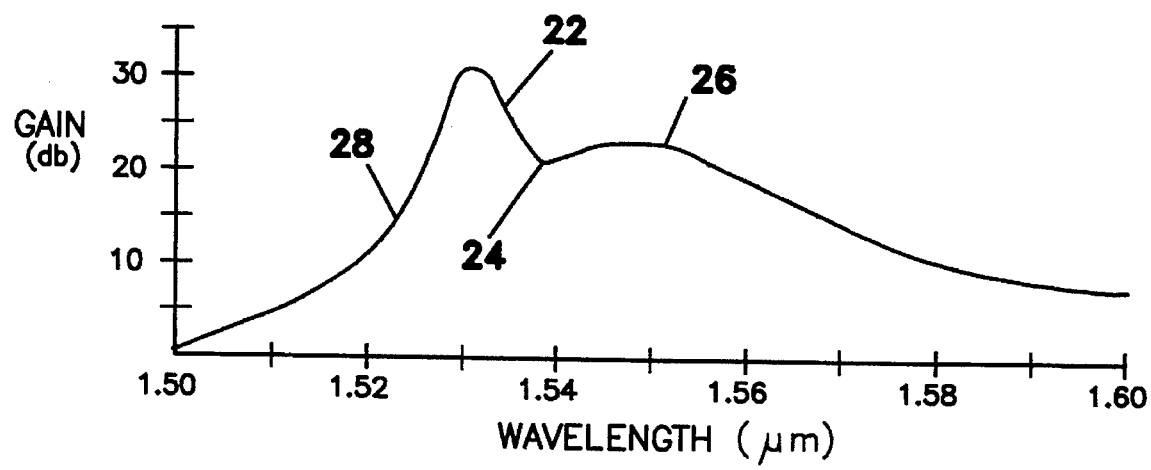
FIG. 4 is a drawing of gain vs. wavelength for an optical amplifier.

For present state of the art erbium doped fiber amplifiers, FIG. 4 shows the possible wavelength ranges which favor wavelength division multiplexing of soliton signal pulses.

A first relatively flat gain portion, 24, occurs in the wavelength range from about 1530 nm to 1540 nm. Assuming a desired channel spacing of about 1.6 nm (200 GHz) more than eight wavelength division multiplexed channels are possible. The longer wavelength relatively flat gain window, 26, covers the range from about 1545 nm to 1565, over which the gain stays within about ±1 dB of the base gain (about 30 dB in the illustrated case in FIG. 2). Ten multiplexed signals could be launched in gain window 26 while allowing sufficient spacing, e.g., 200 GHz, to widen soliton signal shape and power tolerances and minimize cross channel noise.

The inventive combination of a particular dispersion flattened waveguide fiber with soliton signal pulses effectively forces a coincidence in wavelength range, for example in the range from about 1520 nm to 1575 nm, of soliton signal pulses, controlled total dispersion, low total dispersion slope, and, relatively flat optical amplifier gain.

Example System

Figure 5:
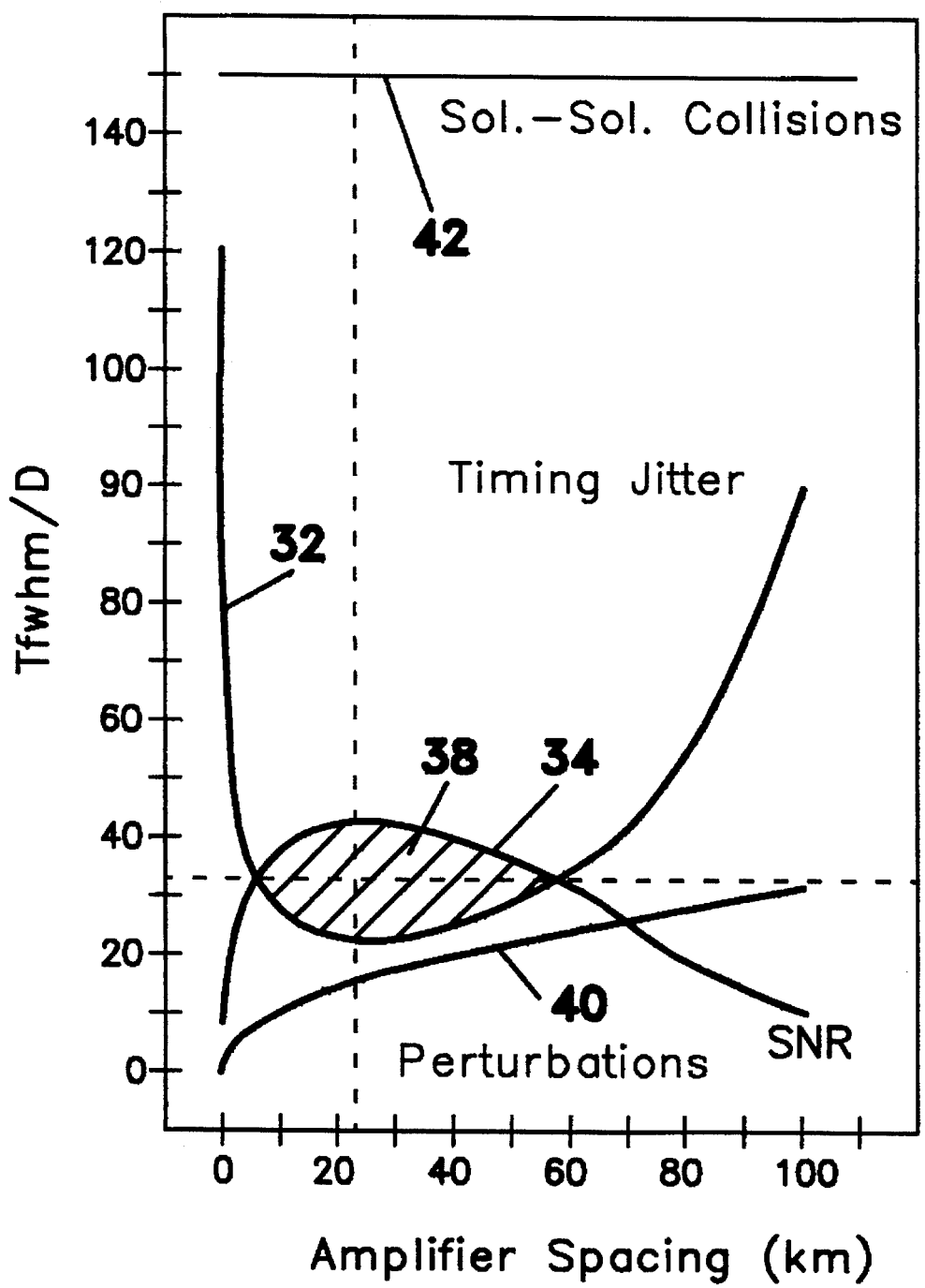
FIG. 5 is a chart showing the region on a $T_{fwhm}/D$ vs. amplifier spacing chart which provides maximum information carrying capacity of a modelled system.

The effect of the soliton pulse shape, expressed as the time width at the half power point, the total dispersion and the amplifier spacing are shown in FIG. 5. The timing and frequency distortion of soliton pulses due to system imperfections (source, amplifier, waveguide) as mentioned above, place practical limits on system length. A good general discussion of soliton limitations is, "Constraints on the Design of Single-Channel, High-Capacity (>10 Gb/s) Soliton Systems", Evans et al., IEEE Photonics Technology Letters, V. 7, No. 1, January 1995.

As illustrated in FIG. 5, a good indicator of system limitation is given by the ratio $T_{fwhm}/D$, where $T_{fwhm}$ is the full width have maximum time dimension of the soliton pulse and D is total dispersion. Curves 32, 34, 40 and 42, show the variation of this ratio with amplifier spacing due to several factors.

Curve 32 represents timing jitter (commonly called Gordon-Haus timing jitter) due to amplification of spontaneous emission in an amplifier and other factors such as long range soliton interaction.

Curve 34 is the effect of the signal to noise ratio on $T_{fwhm}/D$ ratio and amplifier spacing. In like manner, curve 40 pertains to perturbations in the system, including those due to waveguide fiber and optical amplifier variations. Curve 42 illustrates the impact of soliton collisions in systems using lumped amplifiers.

FIG. 5 depicts the response of a 7500 km system operating at a rate of 5 Gbit/s and having an optical amplifier spacing of 25 km. If one chooses a target bit error rate upper limit of $10^{-9}$, then the ratio $T_{fwhm}/D$ must is bounded by the range 25 to 45 nm-km and the optimum value is 33 nm-km (see area 38 of FIG. 5). Assume $T_{fwhm}$ is 16.5 ps for all channels. Then $T_{fwhm}/D=33$, yields an optimum total dispersion, D=0.5 ps/nm-km. Applying the bit error rate limits, $T_{fwhm}/D=25$ and $T_{fwhm}/D=45$, yields the total dispersion limits, 0.37 ps/nm-km$\leq$D$\leq$0.66 ps/nm-km. For a waveguide fiber having a total dispersion of 0.085 ps/nm$^2$-km, the limits on D impose a limit of 3.5 nm on the usable band of wavelengths for multiplexing. This usable band allows about 17 multiplexed channels with a spacing of about 25 GHz.

Comparative Example with Dispersion Flattened Fiber

For exactly the same system as described in the example above, if one uses a dispersion flattened waveguide fiber having a total dispersion slope of 0.01 ps/nm²-km, the usable band of wavelengths increases to 16 nm. This usable band can support 80 channels with spacing of 25 GHz. One may opt, in this case to increase the channel spacing, thereby limiting cross talk between channels and relaxing the tolerances required on the soliton characteristics.

Although particular embodiments of the invention have hereinbefore been disclosed and described, the invention is limited only by the following claims.

What is claimed is:

1. A single mode optical waveguide fiber designed for use in a telecommunication system using soliton signal pulses, comprising:
   a core glass region, having a refractive index profile, said index profile including at least two sub-sections;
   a clad glass layer, having a substantially constant refractive index, $n_c$, surrounding said core glass region, wherein at least a portion of the refractive index profile of at least one sub-section has a refractive index greater than $n_c$;
   said optical waveguide fiber having a total dispersion and a total dispersion slope determined by said core glass region and said clad glass region, wherein the total dispersion, over a pre-selected wavelength range, lies within a pre-selected range of positive values, said positive values being sufficiently positive for balancing self phase modulation of one or more soliton signals and the total dispersion slope over the pre-selected wavelength range lies within a pre-selected range of values, said total dispersion slope being low enough for preventing collision of two or more solitons and low enough for reducing temporal and spectral shifts of said soliton signals to preserve the shape and intensity of one or more solitons propagated in the waveguide, the solitons having a center wavelength within the pre-selected wavelength range.

2. The single mode waveguide of claim 1 wherein the pre-selected wavelength range is about 1300 nm to 1600 nm.

3. The single mode waveguide of claim 1 wherein the positive total dispersion is in the range of about 0.1 to 5.0 ps/nm-km over the pre-selected wavelength range.

4. The single mode waveguide of claim 3 wherein the slope of total dispersion over the pre-selected wavelength range is no greater than about 0.10 ps/nm²-km.

5. A single mode optical waveguide fiber designed for use in a telecommunication system using soliton signal pulses, comprising:
   a core glass region, having a refractive index profile, said index profile including at least two sub-sections;
   a clad glass layer, having a substantially constant refractive index $n_c$, surrounding said core glass region, wherein at least a portion of the refractive index profile of at least one sub-section has a refractive index greater than $n_c$;
   said single mode waveguide characterized by a total dispersion slope over a pre-selected wavelength range; and
   wherein said telecommunication system incorporates at least one optical amplifier, having a substantially uniform gain over an operating wavelength range, which is coincident with at least a part of said pre-selected wavelength range, and coincident with a range of center wavelengths of a plurality of wavelength division multiplexed soliton signal pulses; and,
   wherein the total dispersion slope is no greater than about 0.10 ps/nm²-km over the coincident part of the pre-selected wavelength range, the operating wavelength range of said optical amplifier, and the range of center wavelengths of the soliton signal pulses.

6. The single mode waveguide of claim 5 wherein said optical amplifier is a distributed optical amplifier.

7. The single mode waveguide of claim 5 wherein said optical amplifier is a lumped optical amplifier.

8. The single mode waveguide fiber of claim 5 wherein the pre-selected wavelength range and the operating wavelength range of the at least one amplifier are essentially identical.

9. The single mode waveguide fiber of claim 8 wherein the plurality of wavelength division multiplexed soliton signal pulses is at about eighty and said soliton signal pulses have a channel separation of at least 25 GHz.

10. The single mode waveguide of claim 5 wherein total dispersion is no greater than about 5 ps/nm-km.

* * * * *